US008045554B2

(12) United States Patent
Kim et al.

(10) Patent No.: US 8,045,554 B2
(45) Date of Patent: Oct. 25, 2011

(54) METHOD OF AND APPARATUS FOR PROCESSING VIRTUAL LOCAL AREA NETWORK TAG FRAME

(75) Inventors: Seung Hwan Kim, Daejeon (KR); Je Soo Ko, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 427 days.

(21) Appl. No.: 12/204,220

(22) Filed: Sep. 4, 2008

(65) Prior Publication Data

US 2009/0154471 A1 Jun. 18, 2009

(30) Foreign Application Priority Data

Dec. 13, 2007 (KR) .................. 10-2007-0129930

(51) Int. Cl.
*H04L 12/28* (2006.01)
*H04J 3/16* (2006.01)
*H04J 3/24* (2006.01)
(52) U.S. Cl. .................. 370/389; 370/466; 370/474
(58) Field of Classification Search .................. None
See application file for complete search history.

(56) References Cited

U.S. PATENT DOCUMENTS

| | | | |
|---|---|---|---|
| 6,967,949 B2 | 11/2005 | Davis et al. | |
| 7,379,676 B2* | 5/2008 | Kang et al. | 398/168 |
| 7,684,403 B2* | 3/2010 | Kim et al. | 370/392 |
| 7,796,621 B2* | 9/2010 | Kim et al. | 370/401 |
| 2004/0047353 A1* | 3/2004 | Umayabashi et al. | 370/395.63 |
| 2004/0109450 A1* | 6/2004 | Kang et al. | 370/390 |
| 2006/0023724 A1* | 2/2006 | Na et al. | 370/395.53 |
| 2009/0154471 A1* | 6/2009 | Kim et al. | 370/395.53 |

FOREIGN PATENT DOCUMENTS

| | | |
|---|---|---|
| KR | 1020070025856 | 3/2007 |
| KR | 100809438 B1 | 2/2008 |

OTHER PUBLICATIONS

Korean Office Action 10-2007-0129930, dated Jun. 29, 2009.
Korean Notice of Allowance for Application No. 9-5-2009-036137106, dated Aug. 31, 2009.

* cited by examiner

*Primary Examiner* — Nittaya Juntima
(74) *Attorney, Agent, or Firm* — Nelson Mullins Riley & Scarborugh LLP; EuiHoon Lee, Esq.

(57) ABSTRACT

Provided are a method of and apparatus for processing a virtual local area network (VLAN) tag frame. The apparatus includes a filtering data base (FDB) for storing a VLAN tag frame which is created by a gigabit passive optical network (GPON) master; an uplink processing unit for removing by referring to the FDB a VLAN tag from the VLAN tag frame which is received from the GPON master, and transmitting a data frame to an Ethernet switch; and a downlink processing unit for inserting by looking up the FDB a VLAN tag into the data frame which is received from the Ethernet switch, and then transmitting the data frame to the GPON master. According to the present invention, port identification (ID) information that is lost in a GPON master may be provided to a switch above the GPON master by using a VLAN tag frame processing technology.

6 Claims, 7 Drawing Sheets

METHOD OF AND APPARATUS FOR PROCESSING VIRTUAL LOCAL AREA NETWORK TAG FRAME

CROSS-REFERENCE TO RELATED PATENT APPLICATION

This application claims the benefit of Korean Patent Application No. 10-2007-0129930, filed on Dec. 13, 2007, in the Korean Intellectual Property Office, the disclosure of which is incorporated herein in its entirety by reference.

BACKGROUND OF THE INVENTION

1. Field of the Invention

The present invention relates to a method of and apparatus for processing a virtual local area network (VLAN) tag frame, and more particularly, to a method of and apparatus for processing a VLAN tag frame, wherein an upper switch device directly controls a terminal that is connected to a slave in a general data transmission system.

The present invention is derived from a research project supported by the Information Technology (IT) Research & Development (R&D) program of the Ministry of Information and Communication (MIC) and the Institute for Information Technology Advancement (IITA) [2006-S-060-02, OTH-based 40G Multi-service Transmission Technology].

2. Description of the Related Art

An Ethernet bridge interconnects two or more local area networks (LANs). A port of a bridge may be connected to another bridge, or may be directly connected to a terminal or a router. Because the bridge processes a data link layer (layer 2), the bridge regards a router that processes a network layer (layer 3) as a general terminal. A port of the bridge may also be connected to a one-to-one link or a bus LAN sharing a bus. When an Ethernet frame is to be transmitted, a media access control (MAC) address of a destination (referred to as a destination address (DA)) is located at a front portion of the Ethernet frame and a MAC address of a source (referred to as a source address (SA)) is located next to the DA.

When a data frame is received, a basic function of the bridge is to transmit the data frame to a port that is indicated by a DA of the data frame. Whenever a data frame is received, the bridge learns that an SA of the data frame indicates an input port from which data frame is received, by binding the SA with the input port in an internal filtering data base (FDB) table. Also, the bridge looks up an FDB table entry corresponding to a DA of the data frame, reads the FDB table entry, determines a port that is connected to a destination of the DA, and transmits the data frame to the port. Information on the DA is learned when a data frame having the DA as an SA is received. If a data frame having DA information that has not been learned is received, the data frame is broadcasted to all ports except a port from which the data frame is input, in order to perform data communication. Also, if the DA indicates the port from which the data frame is input, it is considered that the data frame has already been transmitted to the destination and the data frame is disused. As such, terminals and routers which are connected to each other via the bridge, may communicate with each other by using MAC addresses, although they do not know physical locations of opposite parties. In a LAN, if a DA is a broadcast address, a data frame is broadcasted to all segments and, if the bridge does not know a destination, the data frame is flooded to all ports. The bridge checks entries of the FDB and removes an entry corresponding to an SA from which no data frame is input, in order to prevent a problem occurring when data communication is not performed by transmitting a data frame, which is to be transmitted to a certain terminal, to a wrong port due to old information, even though a position of a port of the terminal is changed in view of the bridge. As such, communication may be restarted in a short time by flooding the data frame after the entry is removed and obtaining responses from the destination received the flooded data frame. In general, if no data frame is input from a port that is indicated by a MAC address as an SA, an entry of the MAC address is removed; this process is referred to as an aging process.

The LAN connected via the bridge may be divided into a plurality of virtual local area networks (VLANs). In this case, only terminals included in the same VLAN are connected to each other and terminals included in different VLANs are not connected to each other. The VLANs are used in order to reduce traffics of a whole network by blocking a data frame to be broadcasted between LAN segments which do not need to communicate each other, when the LAN connected via the bridge becomes large, or to restrict transmission of a data frame to a certain group due to security reasons. When the VLANs are used, an Ethernet frame has a mark indicating which VLAN the Ethernet frame belongs to. Such mark is referred to as a VLAN tag. The VLAN tag includes a priority and a VLAN identification (VID) of the Ethernet frame. A bridge providing a VLAN function knows which port is connected to each VLAN. Thus, when a data frame is broadcasted to a certain VLAN, the data frame is broadcasted only to a port group that belongs to the VLAN. A terminal may insert a VLAN tag into a data frame. However, the VLAN tag is inserted into a data frame in a LAN. In general, the VLAN tag is inserted into a data frame based on ports or protocols at an entrance of the LAN. The LAN connected via the bridge is divided into the VLANs in accordance with a predetermined rule. The rule may be manually set for each bridge. Alternatively, the rule that is set for a bridge by a generic VLAN registration protocol (GVRP) may propagate through all bridges which are connected to the LAN, and thus each bridge may know which port is a member port of which VLAN. One port may be a port member of a plurality of VLANs.

In accordance with International Telecommunications Union-Telecommunication Standardization Sector (ITU-T) G.984 gigabit passive optical network (GPON) standards, a port ID is included in a header region of a GPON encapsulation module (GEM) for transmitting a variable length packet, and is used as 4096 unique traffic identifiers for traffic multiplexing. A conventional GPON master in accordance with the above standards may identify a terminal below an optical network terminal (ONT) by using the port ID. However, an upper switch may not find out an identifier of the terminal.

SUMMARY OF THE INVENTION

The present invention provides a method and apparatus for providing port identification (ID) information that is lost in a gigabit passive optical network (GPON) master to a switch, by processing virtual local area network (VLAN) tag frame and ultimately making the switch control an optical network terminal (ONT).

According to an aspect of the present invention, there is provided an apparatus for processing a virtual local area network (VLAN) tag frame, the apparatus including a filtering data base (FDB) for storing information on a VLAN tag frame created by a gigabit passive optical network (GPON) master; an uplink processing unit for removing by referring to the FDB a VLAN tag from the VLAN tag frame received from the GPON master, and transmitting a data frame to an Ethernet switch; and a downlink processing unit for inserting by looking up the FDB a VLAN tag into the data frame which is received from the Ethernet switch, and transmitting the data frame to the GPON master.

According to another aspect of the present invention, there is provided a method of processing a virtual local area network (VLAN) tag frame using an apparatus placed between a gigabit passive optical network (GPON) master and an Ethernet switch, the apparatus for processing the VLAN tag frame by using filtering data base (FDB) memory for storing VLAN tag frame information, the method including (a) determining whether learning has been performed by comparing a source address (SA) in a received Ethernet frame to a value stored in the FDB memory, and performing an FDB write operation by inputting the SA in the Ethernet frame and a VLAN identification (VID) in the FDB memory; and (b) creating a VLAN tag by looking up a destination address (DA) of a data frame toward the GPON master and the SA in the FDB memory, and performing an FDB read operation by inserting the VLAN tag to the data frame.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, the present invention will be described in detail by explaining embodiments of the invention with reference to the attached drawings. However, to avoid complexity of explanation, terms and technical matters which are easily understood by those of ordinary skill in the art will not be described in the following description.

Figure 1:
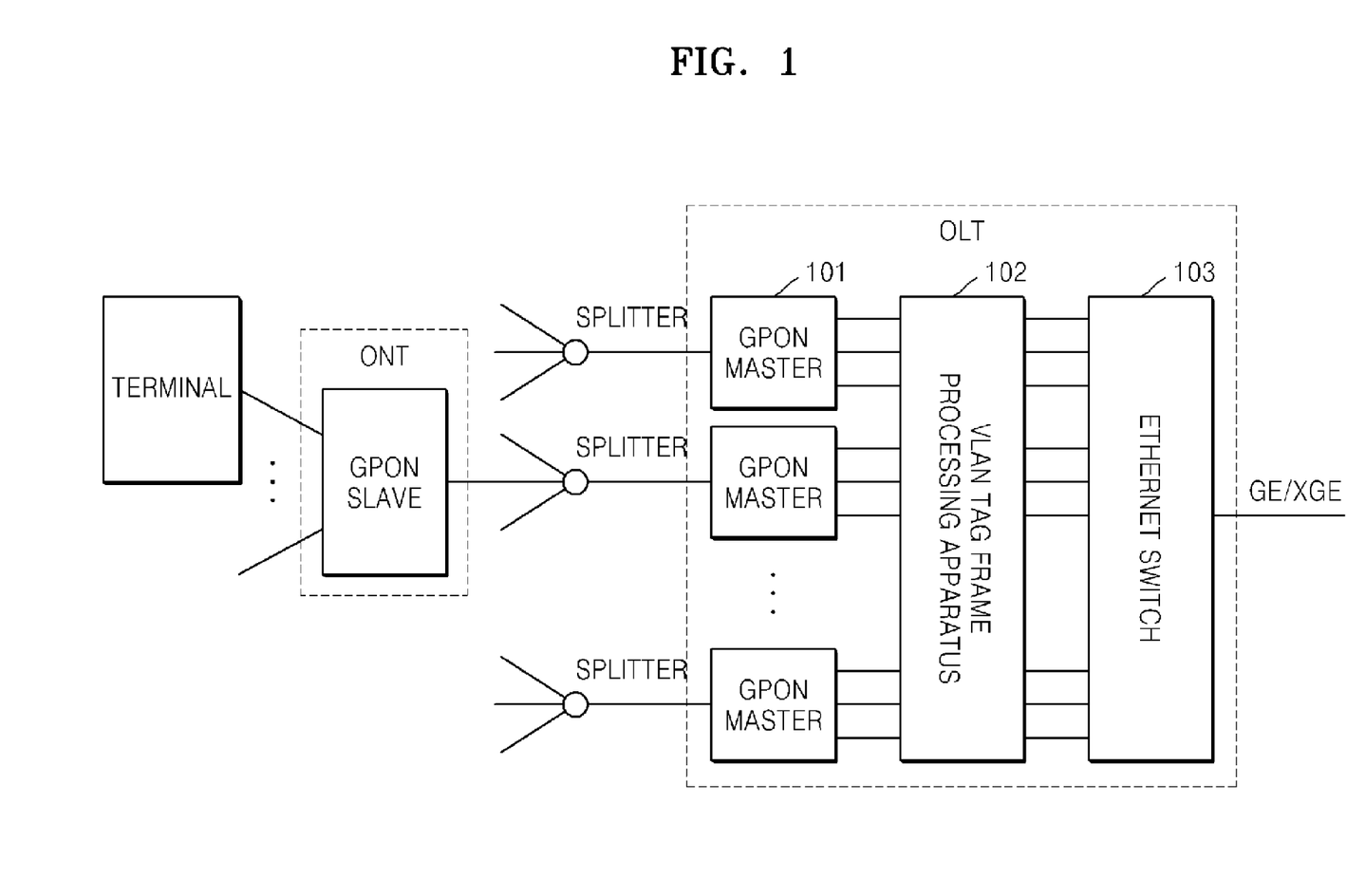
FIG. 1 is a block diagram of a gigabit passive optical network (GPON) system showing a position of a virtual local area network (VLAN) tag frame processing apparatus in the GPON system, according to an embodiment of the present invention.

FIG. 1 is a block diagram of a gigabit passive optical network (GPON) system showing a position of a virtual local area network (VLAN) tag frame processing apparatus 102 in the GPON system, according to an embodiment of the present invention.

Referring to FIG. 1, an optical line terminal (OLT) according to the present invention includes GPON master apparatuses 101, the VLAN tag frame processing apparatus 102, and an Ethernet switch 103.

The VLAN tag frame processing apparatus 102 is located between the GPON master apparatuses 101 and the Ethernet switch 103 in the GPON system.

Figure 2:
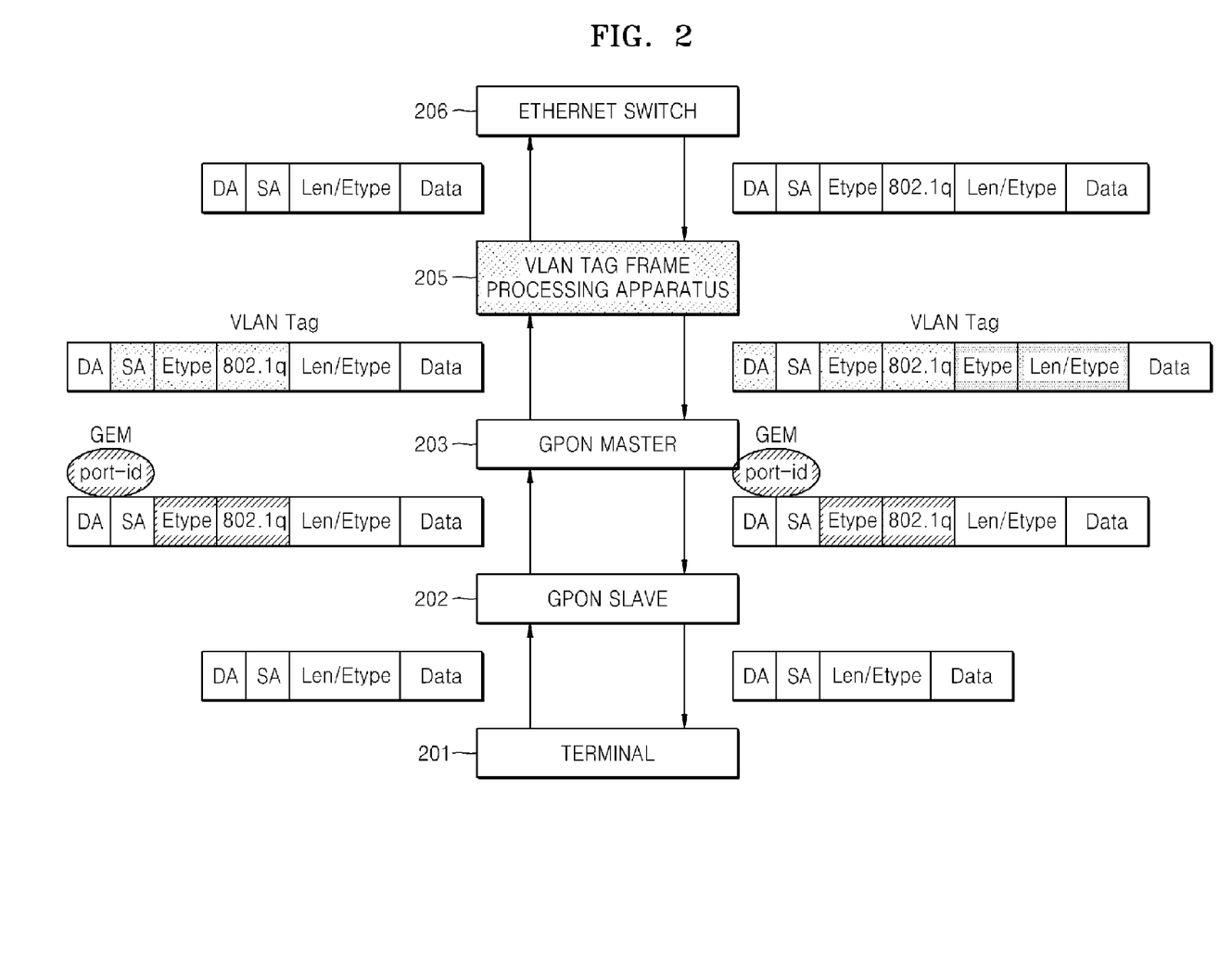
FIG. 2 is a diagram showing data frame variations when a VLAN tag frame processing apparatus or a VLAN tag frame processing method, according to an embodiment of the present invention, is used.

FIG. 2 is a diagram showing a VLAN tag frame processing flow for controlling a terminal 201 in a GPON system, according to an embodiment of the present invention.

Referring to FIG. 2, in an uplink processing operation, information on the terminal 201 below an optical network terminal (ONT) is mapped to port identification (ID) information by a GPON slave 202, the port ID information is transmitted to an optical line terminal (OLT), and a GPON master 203 of the OLT creates a VLAN tag frame instead of the port ID information and transmits the VLAN tag frame to an Ethernet switch 206 above. In this case, instead of the port ID information that is lost, information on the VLAN tag frame that is created by the GPON master 203 is stored in a filtering data base (FDB) by using a VLAN tag frame processing apparatus 205 and the VLAN tag frame is transmitted to the Ethernet switch 206 above so as to complete the uplink processing operation.

On the other hand, in a downlink processing operation, the VLAN tag frame is transmitted from the Ethernet switch 206 above to the GPON master 203 below by searching the FDB for a correct port of the GPON master 203. As such, the downlink processing operation may be smoothly performed without using the port ID information. Each field of frames illustrated in FIG. 2 is obvious to those of ordinary skill in the art and thus a detailed description thereof will be omitted here.

Figure 3:
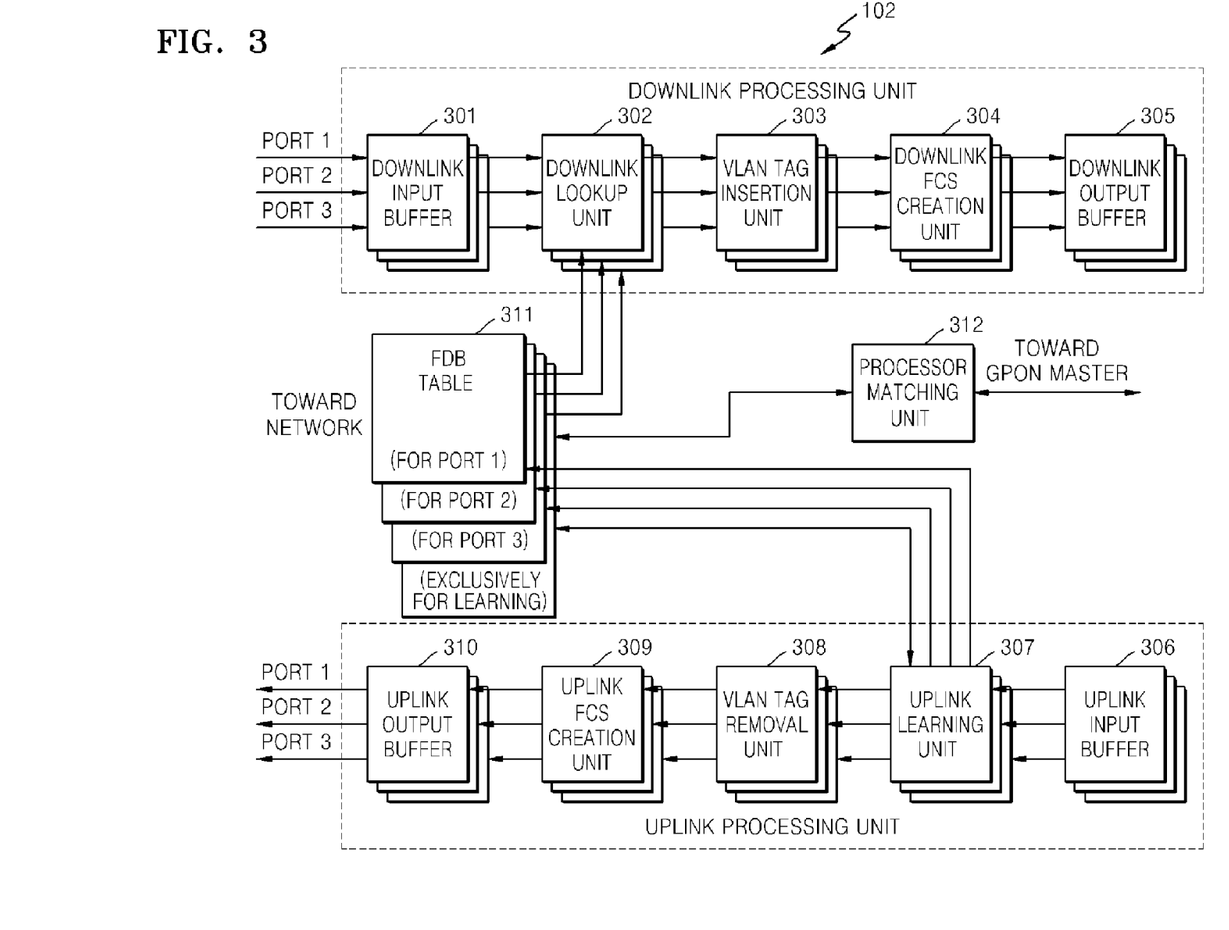
FIG. 3 is a block diagram of a VLAN tag frame processing apparatus according to an embodiment of the present invention.

FIG. 3 is a detailed block diagram of a VLAN tag frame processing apparatus 102 illustrated in FIG. 1, according to an embodiment of the present invention.

In FIG. 3, a GPON system has a downlink bandwidth of 2.5 gigahertz (GHz) and an uplink bandwidth of 1.25 GHz, has three downlink ports and three uplink ports toward an Ethernet switch above the VLAN tag frame processing apparatus 102, and has three downlink ports and two uplink ports toward a GPON master below the VLAN tag frame processing apparatus 102. Unlike the downlink bandwidth, the uplink bandwidth is only 1.25 GHz and thus the GPON system has only two uplink ports toward the GPON master. Also, four identical FDB tables 311 are prepared, and three of them are separately used to interface with three ports of the Ethernet switch above and one of them is used exclusively for uplink learning.

Referring to FIG. 3, a downlink input buffer 301 stores frames which are input from an external device. If one or more frames exist, the downlink input buffer 301 requests a downlink lookup unit 302 to process a frame at a forefront position of the frames, by outputting length information of the frame to the downlink lookup unit 302.

The downlink lookup unit 302 receives a request of the downlink input buffer 301, and, if a length of the frame at the forefront position of the frames is greater than the length of space remaining in a downlink output buffer 305, reads the downlink input buffer 301, reads the FDB tables 311 (also referred to as media access control (MAC) tables) in accordance with a destination address (DA) value, searches for a VLAN ID (VID) corresponding to a destination, and transmits the VID to a VLAN tag insertion unit 303. In this case, if the VID corresponding to the destination is not found, the VID corresponding to broadcasting is transmitted to the GPON master. By mapping three ports to one FDB, although positions of input and output ports are different, if the same GPON master is used, the VID may be found more easily.

A downlink frame check sequence (FCS) creation unit 304 calculates a new FCS value of the frame that is processed by the VLAN tag insertion unit 303, and inserts the FCS value into the frame. The downlink output buffer 305 stores frames passing through a downlink multicast blocking unit (not shown) until the frames are read and actually transmitted by a downlink transmission unit (not shown). If one or more frames exist, the downlink output buffer 305 requests transmission of a frame at a forefront position of a queue, by outputting length information of the frame. When a read signal is received, the downlink output buffer 305 transmits the frame to the downlink transmission unit.

The uplink input buffer 306 stands by in order to process the frame that is transmitted form the GPON master. If one or more frames exist in the uplink input buffer 306, the uplink input buffer 306 requests an uplink learning unit 307 to process a frame at a forefront position of a queue, by outputting length information of the frame. When a read signal is received, the uplink input buffer 306 transmits the frame to the uplink learning unit 307.

If frames exist in the uplink input buffer 306, the uplink learning unit 307 reads the frames, learns source address (SA) values of all the read frames, extracts a VID of a VLAN tag frame indicating which terminal each MAC address corresponds to, and records the VID in the FDB tables 311.

The VLAN tag removal unit 308 removes the VLAN tag frame that is used to extract the VID from a frame that is transmitted from the uplink learning unit 307. Then, a new FCS value is calculated by an uplink FCS creation unit 309 and is transmitted to an uplink output buffer 310.

The uplink output buffer 310 stores frames until the frames are output to a network port and reads and outputs the frames in accordance with speed of an output port.

It is preferable that the four FDB tables 311 are prepared to be the same and three of them are separately used to interface with three gigabit Ethernet (GbE) ports of the Ethernet switch above and one of them is used exclusively for uplink learning. As such, uplink learning of the uplink learning unit 307 and lookup of the downlink lookup unit 302 may be performed without problems in real time under any worst condition. The FDB tables 311 include SA information and VID information which indicate each MAC address of frames input from the GPON master and port information on a port that is connected to the MAC address. Also, each entry includes a V bit indicating whether the entry is valid, an S bit indicating that the entry is a static entry created not by learning but by setting of a central processing unit (CPU), and an A bit indicating that the entry is an old entry. The A bit is periodically set to 1 by the CPU and is reset to 0 whenever a frame having a MAC address of the entry as an SA is input. If the A bit is still 1 when an entry is read at a subsequent period, the entry is determined to be an old entry to which nothing is input for a period and the old entry may be removed. The FDB tables 311 will be described in detail later with reference to FIGS. 5A through 5C.

A process matching unit 312 is an interface communicating with an external CPU by using signals such as data, address, and read/write enable signals, and allows the external CPU to read data on the number of frames and communication errors and to set important parameters.

Figure 4:
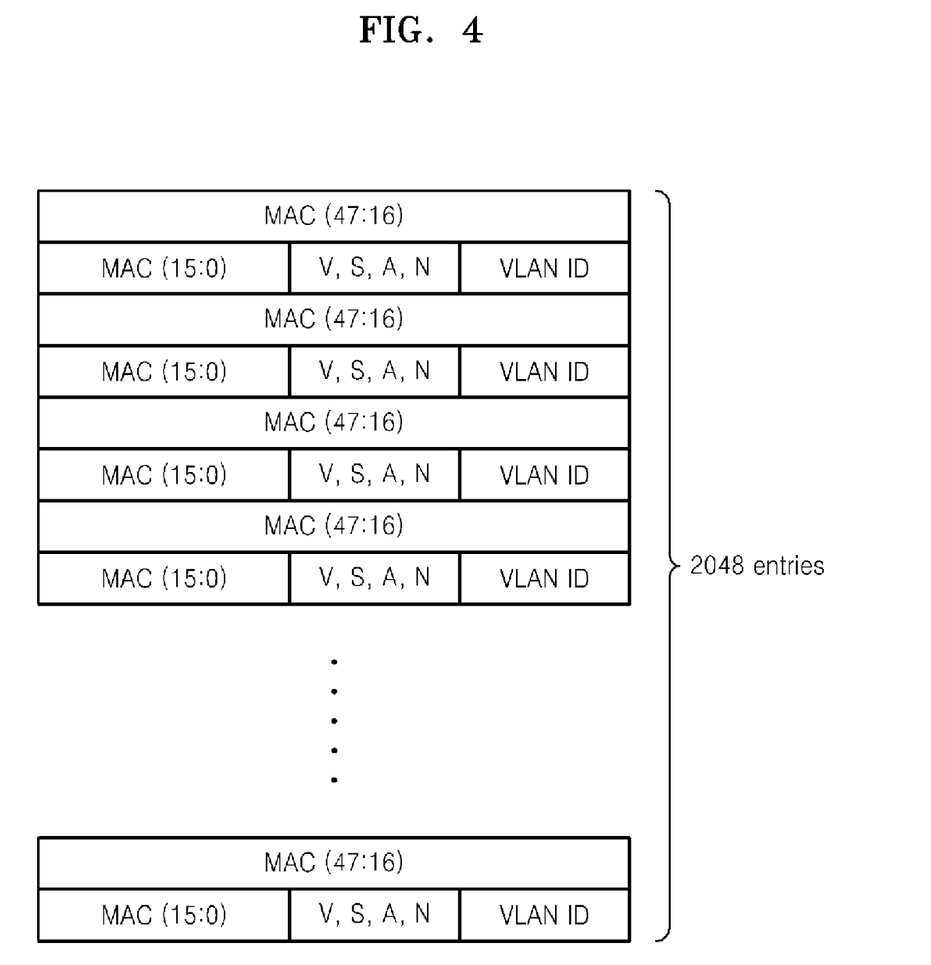
FIG. 4 is a media access control (MAC) table according to an embodiment of the present invention.

FIG. 4 is an FDB table according to an embodiment of the present invention.

Referring to FIG. 4, a MAC address has 48 bits and the FDB table may have 2^48 values. In order to perform learning or lookup by using a limited memory capacity, a plurality of MAC addresses have to share a small storage space. If the FDB table includes 4K entries, a 12-bit entry address has to be obtained by using an MAC address having 48 bits. In general, the 12-bit entry address may be easily obtained by dividing the MAC address by using a cyclic redundancy check 32 (CRC32) function and by taking lower 11 bits from the divided MAC address. In the present invention, in order to more efficiently use resources of the FDB table, the entry address may be used together with an associated address that is located at a certain offset. The associated address may be used by checking the associated address when the lookup or the learning is performed. That is, when the learning is performed an entry obtained by a hash and an associated address of the obtained entry may be checked at the same time. If corresponding MAC data is not recorded, the MAC data is recorded in any one of the entry and the associated address, which is empty. Also, when the lookup is performed, an entry obtained by a hash and an associated address of the obtained entry may be checked at the same time. If corresponding MAC data is not recorded, the MAC data is selectively recorded in the entry or the associated address. As such, a possibility of not being able to perform the learning or the lookup due to lack of space if values obtained by a hash are accidentally the same in the FDB table, may be reduced a lot.

Figure 5A:
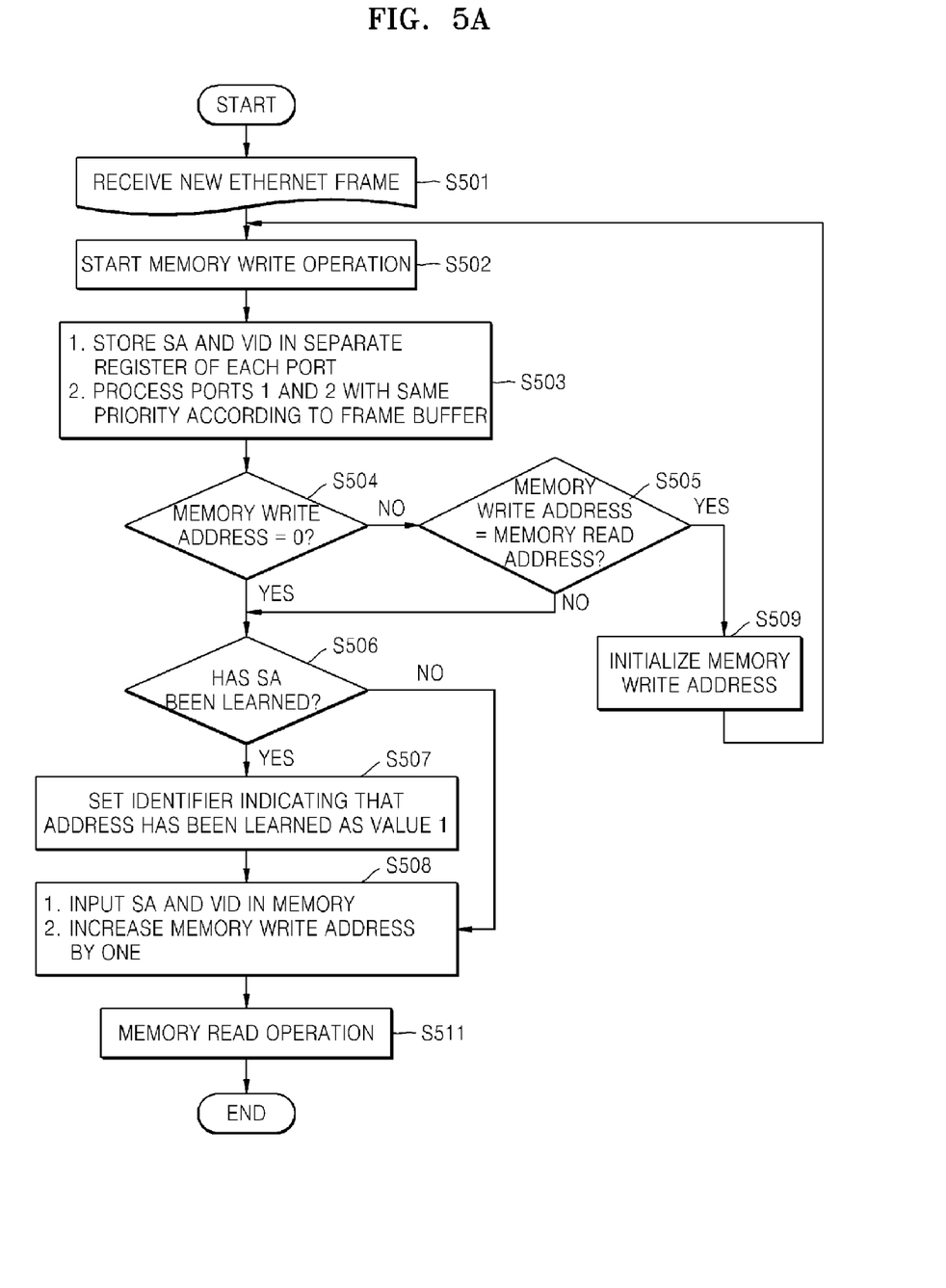
FIG. 5A is a flowchart of a write operation in a VLAN tag frame processing method, according to an embodiment of the present invention.
Figure 5B:
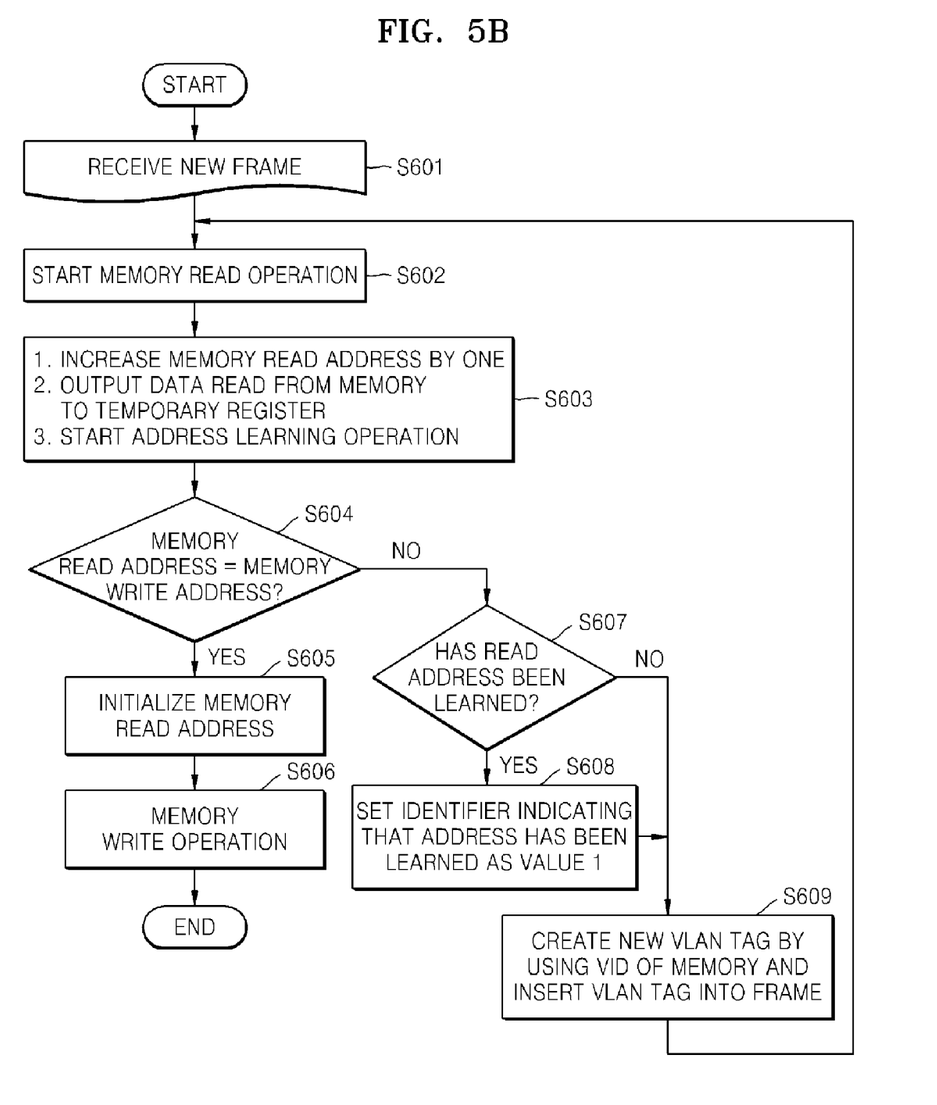
FIG. 5B is a flowchart of a read operation in a VLAN tag frame processing method, according to an embodiment of the present invention.
Figure 5C:
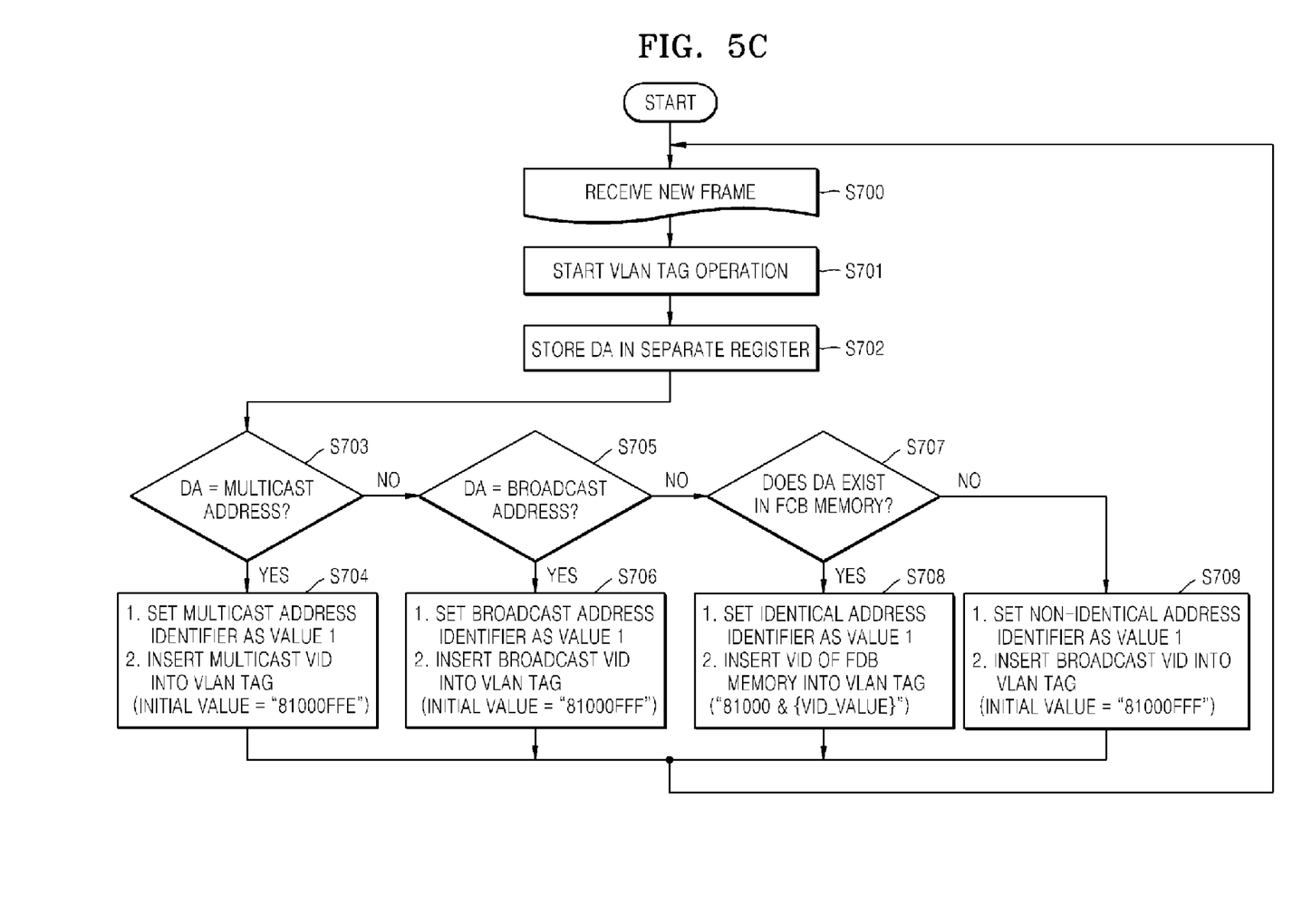
FIG. 5C is a flowchart of a tag operation in a VLAN tag frame processing method, according to an embodiment of the present invention.

FIGS. 5A through 5C are flowcharts of a memory write operation, a memory read operation, and a VLAN tag operation, respectively, for performing an uplink learning function and a downlink lookup function, according to embodiments of the present invention.

FIG. 5A is a flowchart of a memory write operation of FDB memory, according to an embodiment of the present invention.

Referring to FIG. 5A, when a frame buffer receives a new Ethernet frame in operation S501, the memory write operation is started in operation S502. An SA and a VID are extracted from the Ethernet frame and are stored in a separate register of each port.

Two ports are processed with the same priority in consideration of a size of remaining space of the frame buffer in operation S503 and if two ports receive data at the same time, port 1 of the two ports is processed with a higher priority. It is checked whether a memory write address has a value 0, in operation S504. If the memory write address does not have the value 0, it is checked whether the memory write address is identical to a memory read address, in operation S505. If the memory write address is identical to the memory read address, a size of the FDB memory is restrictive and thus the memory write address is initialized in operation S509. After operation S509 is performed, the memory write operation returns to operation S502. If the memory write address has the value 0, it is checked whether the SA has been learned, by using a value read from an FDB table, in operation S506. If the SA has been learned, an identifier indicating that an address has been learned is set as a value 1, in operation S507. Regardless whether the SA has been learned or not, the SA and the VID are input in the FDB memory and the memory write address is increased by one, in operation S508. Then, a memory read operation is performed in operation S511.

FIG. 5B is a flowchart of a memory read operation of FDB memory, according to an embodiment of the present invention.

Referring to FIG. 5B, when a new frame is received in operation S601, the memory read operation is started in operation S602. A memory read address is increased by one, data such as an SA and a VID, which is read from the FDB memory, is output to a temporary register, and an address learning operation is started, in operation S603. It is checked whether the memory read address is identical to a memory write address, in operation S604. If the memory read address is identical to the memory write address, the memory read address is initialized in operation S605. Then, a memory write operation is performed in operation S606.

If the memory read address is not identical to the memory write address, it is checked whether a DA is identical to the SA of an FDB table, in operation S607. If the DA is identical to the SA, an identifier indicating that lookup has been performed is set as a value 1, in operation S608, a VLAN tag is created by using the VID that is read from the FDB memory, and is inserted into a determined position of an Ethernet frame, in operation S609. After operation S609 is performed, the memory read operation returns to operation S602.

FIG. 5C is a flowchart of a VLAN tag operation according to an embodiment of the present invention. In FIG. 5C, a method of creating a VLAN tag when downlink lookup is performed.

Referring to FIG. 5C, a new frame is received in operation S700, the VLAN tag operation is started in operation S701, and a DA is stored in a separate register, in operation S702. Then, it is checked whether the DA is a multicast address, in operation S703. If the DA is a multicast address, a multicast address identifier is set to 1 and a multicast VID having an initial value of "81000FFF" is inserted into the VLAN tag, in operation S704. After operation S704 is performed, the VLAN tag operation returns to operation S700. If the DA is not a multicast address, it is checked whether the DA is a broadcast address, in operation S705. If the DA is the broadcast address, a broadcast address identifier is set as a value 1 and a broadcast VID having an initial value of "81000FFF" is inserted into the VLAN tag, in operation S706. After operation S706 is performed, the VLAN tag operation returns to operation S700. If the DA is neither a multicast address nor a broadcast address, it is checked whether the DA is one of SAs which are read from FDB memory, in operation S707. If the DA is one of the SAs, an identical address identifier is set as a value 1 and a VID that is read from the FDB memory is processed into four bits and is inserted into the VLAN tag by adding a value "81000" to the front of the VID, in operation S708. After operation S708 is performed, the VLAN tag operation returns to operation S700. If the DA is not any one of the multicast address, the broadcast address, and one of the SAs, a non-identical address identifier is set as a value 1 and the broadcast VID having the initial value of "81000FFF" is inserted into the VLAN tag, in operation S709. After operation S709 is performed, the VLAN tag operation returns to operation S700.

The present invention can also be implemented as computer-readable code on a computer-readable recording medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, optical data storage devices, and carrier waves (such as data transmission through the Internet). The computer-readable recording medium can also be distributed over network-coupled computer systems so that the computer-readable code is stored and executed in a distributed fashion. Also, functional programs, codes, and code segments for accomplishing the present invention can be easily construed by programmers skilled in the art to which the present invention pertains.

As described above, according to the present invention, port ID information that is lost in a GPON master may be provided to a switch above the GPON master by using a VLAN tag frame processing technology. Thus, information on a terminal below a GPON slave may be indirectly provided to the switch such that data between the GPON master and the switch may be mutually complemented.

In particular, general functional efficiency may be maximized by using a VLAN tag processing apparatus or a VLAN tag processing method in a commercializable GPON network by using uplink and downlink characteristics.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of processing a virtual local area network (VLAN) tag frame using an apparatus placed between a gigabit passive optical network (GPON) master and an Ethernet switch, the apparatus for processing the VLAN tag frame by using filtering data base (FDB) memory for storing VLAN tag frame information, the method comprising:

performing an FDB write operation by determining whether learning has been performed by comparing a source address (SA) in a received Ethernet data frame from the Ethernet switch to a value stored in the FDB memory and inputting the SA in the Ethernet data frame and a VLAN identification (VID) in the FDB memory; and creating a VLAN tag by looking up a destination address (DA) of a data frame toward the GPON master and the SA in the FDB memory, and performing an FDB read operation by inserting the VLAN tag to the data frame, wherein the VLAN tag is inserted in the data frame by the apparatus placed between the GPON master and the Ethernet switch, wherein performing the FDB write operation comprises:
storing the SA and the VID for each port;
checking whether a memory write address for the FDB memory has a value 0;
comparing the memory write address with a memory read address for the FDB memory if the checked memory write address does not have the value 0;
initializing the memory write address and re-storing the SA and the VID if the memory write address is identical to the memory read address according to the comparison result and
performing the FDB write operation if the memory write address has the value 0, or if the memory write address does not have the value 0 and is not identical to the memory read address.

2. The method of claim 1, wherein, if two ports receive data frames from the Ethernet switch, storing the SA and the VID comprises processing the two ports with the same priority based on a size of a buffer which temporarily stores the data frames.

3. The method of claim 1, wherein performing the FDB write operation comprises:
if the SA has been learned, setting an identifier indicating that the SA has been learned; and
increasing a memory write address for the FDB memory by one.

4. The method of claim 1, wherein creating the VLAN tag comprises:
increasing a memory read address for the FDB memory by one, and then reading the SA and the VID from the FDB memory;
comparing the memory read address with a memory write address for the FDB memory;

initializing the memory read address, and re-performing an FDB write operation, if the memory read address is identical to the memory write address according to the comparison result; and checking whether the SA has been learned, and re-increasing the memory read address by one, if the memory read address is not identical to the memory write address.

5. The method of claim 4, wherein, checking whether the SA has been learned comprises:

checking whether the SA has been learned by comparing the DA with the SA in the FDB memory, if the memory read address is not identical to the memory write address;

setting an identifier indicating that an address has been learned, if the SA has been learned; and creating the VLAN tag based on the VID which is stored in the FDB memory, inserting the VLAN tag into the data frame.

6. The method of claim 1, further comprising:
storing the DA in the data frame;
if the DA is a multicast address, setting a multicast identifier, inserting a multicast VID into the VLAN tag;
if the DA is not the multicast address, checking whether the DA is a broadcast address, and, if the DA is the broadcast address, setting a broadcast identifier, inserting a broadcast VID into the VLAN tag;
if the DA is not the broadcast address, checking whether an SA corresponding to the DA exists in the FDB memory, and, if the SA corresponding to the DA exists in the FDB memory, setting an identical address identifier, inserting the VID which is read from the FDB memory, into the VLAN tag; and
if the SA corresponding to the DA does not exist in the FDB memory, setting a non-identical address identifier, inserting the broadcast VID into the VLAN tag.

* * * * *